No. 644,394. Patented Feb. 27, 1900.
W. M. BAKER.
HARROW.
(Application filed July 15, 1899.)
(No Model.)
FIG. 1.
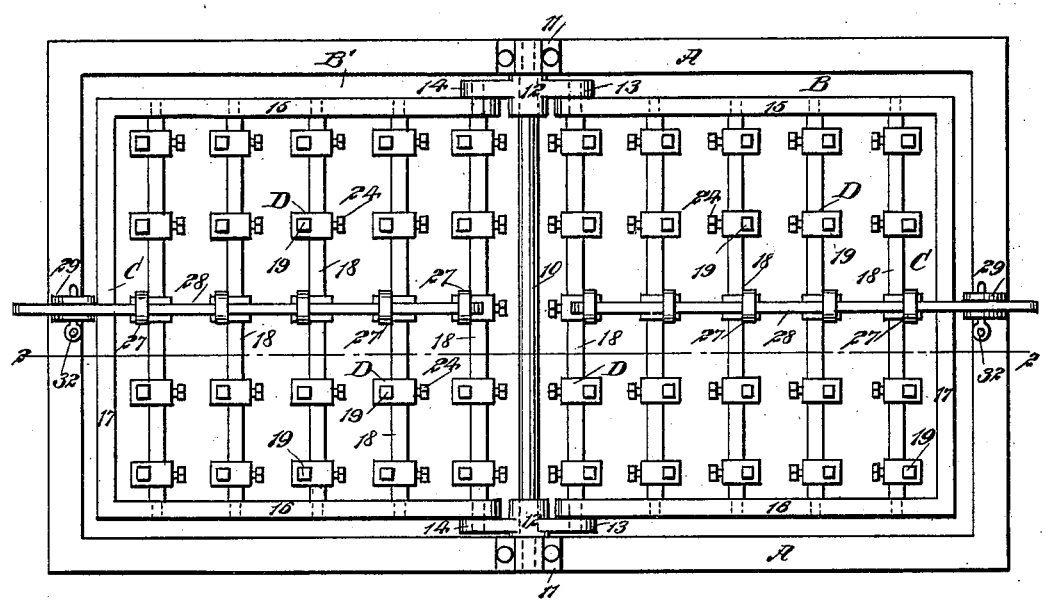
FIG. 2.
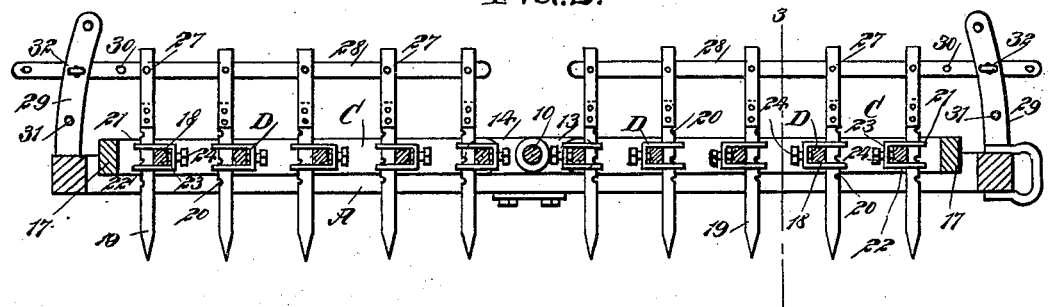
FIG. 3.
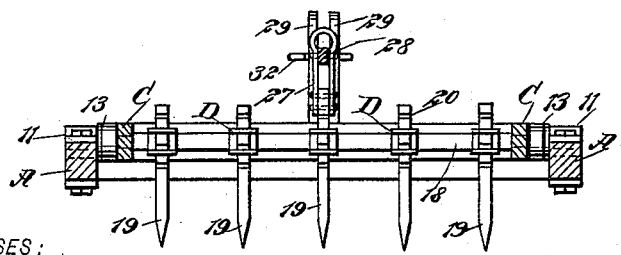
FIG. 4.
WITNESSES:
Donn Twitchell
J. Wedekker
INVENTOR
W. M. Baker
BY
ATTORNEYS

UNITED STATES PATENT OFFICE.

WILLIAM M. BAKER, OF FORTVILLE, INDIANA, ASSIGNOR OF ONE-HALF TO CORYDON M. RICH AND JAMES G. THOMAS, OF MUNCIE, INDIANA.

HARROW.

SPECIFICATION forming part of Letters Patent No. 644,394, dated February 27, 1900.

Application filed July 15, 1899. Serial No. 723,903. (No model.)

*To all whom it may concern:*

Be it known that I, WILLIAM M. BAKER, of Fortville, in the county of Hancock and State of Indiana, have invented a new and Improved Harrow, of which the following is a full, clear, and exact description.

My invention relates to an improvement in harrows, and especially to an improvement upon the construction shown in Letters Patent that were granted to me December 27, 1898, No. 616,817.

The objects of the invention are to provide a simple and effective pivotal device for two harrow or toothed frames in a main frame and also to provide a clamping device for the teeth that will not weaken the teeth-carrying bars and while holding the teeth securely in place will permit them to be vertically adjusted upon said bars.

A further object of the invention is to so construct the teeth and their clamping devices that the teeth may be held a uniform distance apart and adjusted to perfect alinement.

Another object of the invention is to provide a shifting device that will enable the harrow or toothed frames to be readily adjusted up or down and the teeth in the frames be given any desired angle.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of a double harrow having the improvements applied. Fig. 2 is a longitudinal vertical section taken practically on the line 2 2 of Fig. 1. Fig. 3 is a transverse section taken substantially on the line 3 3 of Fig. 2; and Fig. 4 is an enlarged transverse section through a tooth-carrying bar and a tooth-clamp, showing a portion of a tooth in side elevation.

The main frame A is preferably rectangular, as shown in Fig. 1, and a shaft 10 extends transversely at the central portion of said main frame, the ends of the shaft being journaled in suitable bearings 11, carried by the side bars of the said main frame. Within the main frame, adjacent to the ends of the shaft 10, hubs 12 are secured to said shaft, and each hub is provided with two opposing side wings 13 and 14, one wing extending in direction of the front of the frame and the other in direction of the rear of the frame. The shaft 10 separates the main frame into two divisions or compartments B and B', and in each of these divisions or compartments a harrow or tooth-carrying frame C is located. Each of the harrow-frames C preferably consists of side bars 15 and 16 and an outer end bar 17. A series of toothed supporting-bars 18, usually rectangular in cross-section, is located within each harrow-frame C, extending from side to side, and the ends of the toothed supporting-bars are journaled in the sides of the said harrow-frame. The trunnions of the innermost toothed supporting-bar 18 of each harrow-frame extend beyond the sides of the frame and enter the wings of the hubs 12, one harrow-frame thus being pivotally attached to the wings 13 and the other harrow-frame to the wings 14, as shown in Fig. 1. Thus it will be observed that a very simple and economic means is provided for independently pivoting each harrow-frame in the main frame.

Each toothed supporting-bar is adapted to carry a series of teeth 19, and the teeth of all of said bars are arranged in the same order. The teeth 19 do not pass through the bars 18. Thus the latter are not weakened. Each tooth is provided with a series of notches or recesses 20 in its outer edge, particularly in the shank portion of the tooth, and the inner plain edges of the teeth are adapted to bear against the outer side faces of the said carrying or supporting bars 18, as shown in Fig. 2.

Each tooth is provided with an individual clamp D. As shown in Fig. 4, these clamps consist of an upper horizontal member 21, a lower horizontal member 22, and a connecting member 23, the connecting member being provided with a set-screw 24, whose inner end is usually pointed to enter depressions in a toothed supporting-bar. The set-screws 24 engage with the inner sides of the toothed supporting-bars, and each clamp is provided with a slot 25 in its upper member and a slot 26 in its lower member; but the forward wall of the upper slot 25 in the clamp is farther inward than the corresponding wall of the lower slot 26, as shown also in Fig. 4. When a clamp is placed in position on a bar 18, a tooth is introduced through the slots of the clamp, and as the set-screw 24 of the clamp is tightened up the outer wall of the upper slot 25 in the clamp will enter a notch 20 in the shank of the tooth, while the corresponding wall of the slot 26 of the clamp will engage with the plain surface of the shank. In this manner the teeth are firmly, yet securely, held in position and may be vertically adjusted as their points become broken or worn.

Arched or forked arms 27 are attached to the central teeth of each transverse section in each of the harrow-frames, and the shanks of these teeth are made longer than the others. The forked bars of each harrow-frame receive between them a shifting bar 28, to which they are pivotally attached, and said shifting bars 28 pass between standards 29, secured to the central end portions of the main frame, the standards being inwardly curved. The outer end of each shifting bar 28 is provided with a series of apertures 30, and the standards 29 are likewise provided with a series of apertures 31. When the central apertures in the shifting bars are in registry with the central apertures in the standards 29, the teeth 19 are vertical, and the shifting bars are held in adjusted position by means of pins 32. When the outer hole in the shifting bar of the forward harrow-frame is brought in registry with the central aperture in the standard, the teeth of the forward harrow frame will slope forwardly. The same forward inclination can be given to the teeth of the other harrow-frame by bringing the inner hole in its shifting bar in registry with the central hole in the corresponding standard. This will give a digging or plowing action. By reversing the positions of the two shifting bars the points of the teeth will slope to the rear, and this will give a leveling action, and when the teeth are vertical, as illustrated, a harrowing or crushing action is obtained. When a shifting bar 28 is carried to an upper aperture in a standard 29, the teeth will be raised; but when a shifting bar 28 is carried to the lower aperture in a standard 29 the teeth will be carried downward proportionately, and their inclination may be adjusted by the longitudinal movement of the shifting bar. Thus it will be observed that the vertical movement of the shifting bar adjusts the teeth bodily, since the entire harrow-frame is moved, and the longitudinal movement of a shifting bar adjusts the teeth collectively as to their angles.

It will be observed that the adjustment of each harrow-frame and its teeth is independent. Thus the teeth of one frame may be given inclination in one direction and the teeth of the other harrow-frame may be given an opposite inclination.

Having thus described my invention, I claim as new and desire to secure by Letters Patent—

1. In a double harrow, a main frame, a transverse shaft mounted in said frame, oppositely-extending supports carried by said shaft, and oppositely-extending toothed frames pivotally connected with said supports.

2. In a double harrow, a main frame, a shaft mounted in said frame and provided with hubs each having two opposing side wings and oppositely-extending toothed frames located within the main frame and pivotally connected with the wings of the hubs.

3. In a double harrow, a main frame, a shaft mounted in said frame and provided with hubs having opposing side wings, oppositely-extending harrow-frames located within the main frame and each provided with a series of supporting-bars journaled in the sides of the respective frames, the trunnions of the innermost supporting-bar of each harrow-frame extending beyond the sides of the frame and entering the respective wings of the hubs, a series of teeth carried by each of said bars, arms secured to the upper ends of corresponding teeth carried by said supporting-bars of each harrow-frame and a shifting bar for each harrow-frame pivotally connected with the upper portions of said arms and arranged to raise and lower the harrow-frames and control the inclination of the teeth.

4. In a harrow, the combination with a main frame, a harrow-frame pivoted at one end in the main frame, transverse supports pivoted in the sides of the harrow-frame and teeth secured to the said supports, of arms secured to the central teeth of said supports, a shifting bar pivotally connected with the upper portions of said arms, a standard secured to the main frame and arranged to receive and guide the shifting bar, the said standard being provided with a series of apertures and the outer end of the shifting bar being likewise provided with a series of apertures each adapted to be brought into registry with either of the apertures in the standard and means for securing the parts in the adjusted position, whereby the longitudinal throw of the shifting bar and its vertical adjustment may be regulated.

5. In a harrow, a main frame, a shaft mounted in said frame and provided with hubs, wings extending from said hubs and a harrow-frame located within the main frame, and pivotally connected at one end with the wings of the hub.

6. In a harrow, a main frame, a harrow-frame located within the main frame, transverse supports journaled at their ends in the sides of the harrow-frame, the trunnions of the supports at one end of the harrow-frame extending beyond the sides of said harrow-frame and pivotally connected with the main frame, teeth secured to the transverse supports and a regulating device arranged to raise and lower the harrow-frame and control the inclination of the teeth of said frame.

WM. M. BAKER.

Witnesses:
JOHN A. GARDNER,
ARDEN H. THOMAS.